US 7,050,893 B2

(12) United States Patent
Watanabe et al.

(10) Patent No.: US 7,050,893 B2
(45) Date of Patent: May 23, 2006

(54) METHOD OF DETECTION OF ACTUAL OPERATING TIME OF MACHINERY DEPLOYED AT CONSTRUCTION SITES, DATA COLLECTION AND MANAGEMENT SYSTEM, AND BASE STATION

(75) Inventors: Hiroshi Watanabe, Ushiku (JP); Koichi Shibata, Ibaraki (JP); Hiroyuki Adachi, Tsuchiura (JP); Toichi Hirata, Ushiku (JP); Genroku Sugiyama, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 175 days.

(21) Appl. No.: 10/240,112

(22) PCT Filed: Mar. 30, 2001

(86) PCT No.: PCT/JP01/02782

§ 371 (c)(1),
(2), (4) Date: Sep. 27, 2002

(87) PCT Pub. No.: WO01/73219

PCT Pub. Date: Oct. 4, 2001

(65) Prior Publication Data
US 2003/0054808 A1 Mar. 20, 2003

(30) Foreign Application Priority Data
Mar. 31, 2000 (JP) ............................. 2000-100020
Mar. 31, 2000 (JP) ............................. 2000-100024

(51) Int. Cl.
*G01M 17/00* (2006.01)
*G06F 19/00* (2006.01)

(52) U.S. Cl. ............................ 701/33; 701/29; 701/30; 701/35; 701/50; 702/182

(58) Field of Classification Search ............ 701/29–30, 701/33, 35, 50, 113, 114; 702/182–185
See application file for complete search history.

(56) References Cited

U.S. PATENT DOCUMENTS 4,462,079 A * 7/1984 Ito et al. .................... 701/123

(Continued)

FOREIGN PATENT DOCUMENTS

JP 1-288991 11/1989

(Continued)

*Primary Examiner*—Gertrude A. Jeanglaude
(74) *Attorney, Agent, or Firm*—Mattingly, Stanger, Malur & Brundidge, P.C.

(57) ABSTRACT

The present invention is applied to a system comprised of large number of hydraulic excavators 1 deployed at construction sites and a base station 16. Each hydraulic excavator 1 is provided with a storage unit (memory 402), a control unit (CPU 401) for executing the work operation and receiving as input a quantitative machine status relating to the work operation, and a communications device 42. The base station 16 is provided with a communications device 16a, a management server 17 for identifying the serial number of the hydraulic excavator 1 and transferring information, and a database 18 for storing various information. The control unit of the hydraulic excavator 1 and the management server 17 of the base station 16 transfer information. With this system configuration, the control unit measures the duration during which the quantitative machine status satisfies a predetermined condition and stores it in the storage unit and transmits the measurement data of the duration to the management server 17 of the base station 16 conditional on the power input key being in the off position, while the management server 17 receives the measurement data of the duration and calculates the cumulative operating time. Further, the quantitative machine status and various event data stored in the storage unit of the hydraulic excavator 1 are sent to the base station 1, while the management server of the base station 16 stores the quantitative machine status and various event data in the database 18 by a predetermined format.

26 Claims, 9 Drawing Sheets

U.S. PATENT DOCUMENTS

| | | | | |
|---|---|---|---|---|
| 4,853,859 | A | * | 8/1989 | Morita et al. .................. 701/35 |
| 4,970,492 | A | * | 11/1990 | King ........................ 340/450.3 |
| 5,617,373 | A | * | 4/1997 | Kawai et al. ................... 368/5 |
| 5,969,601 | A | * | 10/1999 | Sato et al. ............... 340/450.3 |
| 5,995,886 | A | * | 11/1999 | Tanaka et al. ................ 701/30 |
| 6,256,594 | B1 | * | 7/2001 | Yamamoto et al. ......... 702/185 |
| 6,339,737 | B1 | * | 1/2002 | Yoshimura et al. ........... 701/50 |
| 6,349,252 | B1 | * | 2/2002 | Imanishi et al. .............. 701/50 |
| 6,542,851 | B1 | * | 4/2003 | Hasegawa et al. .......... 702/182 |
| 6,614,361 | B1 | * | 9/2003 | Kinugawa .............. 340/870.16 |
| 2002/0156558 | A1 | * | 10/2002 | Hanson et al. ................ 701/33 |

FOREIGN PATENT DOCUMENTS

| | | |
|---|---|---|
| JP | 2-54593 | 11/1990 |
| JP | 3-017321 | 1/1991 |
| JP | 8-144312 | 6/1996 |
| JP | 10-308983 | 11/1998 |
| JP | 11-036381 | 2/1999 |
| JP | 11-113072 | 4/1999 |

* cited by examiner

38 WORKING MECHANISM

METHOD OF DETECTION OF ACTUAL OPERATING TIME OF MACHINERY DEPLOYED AT CONSTRUCTION SITES, DATA COLLECTION AND MANAGEMENT SYSTEM, AND BASE STATION

TECHNICAL FIELD

The present invention relates to a method of detection of the actual operating time of machinery comprising providing a base station for construction machinery such as hydraulic excavators deployed at construction sites and forming a communication line between the base station and the machinery to enable transfer of information between the two to obtain a grasp of the accurate operating time of the machinery by the base station located at a distant location and a data collection and management system of machinery easy to use by users, dealers, and other information users. Further, the present invention relates to a base station for constructing the above systems.

BACKGROUND ART

As a reference disclosing conventional related art, Japanese Unexamined Patent Publication (Kokai) No. 1-288991 may be mentioned. This publication discloses a maintenance monitoring device. This maintenance monitoring device informs the operator of the time for replacement of oil, the oil filter, or other parts in a construction machine. With the device according to this document, it is possible to inform the operator of the remaining period until the replacement time.

Recently, in construction machines such as hydraulic excavators, there has been a growing need for designing intelligent machines using high performance computers and sophisticated function programs, for greater flexibility in use of IT to enable work to be freely changed by users, and for use of IT at manufacturers producing machinery to manage sophisticated function machinery (collect and transfer data), perform troubleshooting for and individually maintain individual machinery, and provide and propose sophisticated services to the users. Under this situation, none of the conventional devices is sufficient. Construction of a more sophisticated system actively using IT is therefore desired.

In particular, from the viewpoint of the replacement of parts, it is most important to obtain accurate information on the time of operation of the hydraulic excavators etc., that is, the actual time of operation (hereinafter referred to as the "actual operating time"). If not able to know the actual operating time, one cannot replace parts at the optimal timing.

For example, replacement parts of a hydraulic excavator include the engine oil, engine oil filter, the bucket claws of the front, the front pins (for example, connecting pins of the frame and arm), the bushings around the front pins, the turn system transmission oil, the turn system transmission seals, the travel system transmission oil, the travel system transmission seals, the travel system shoes, etc. Among these, the engine oil and engine oil filter are mainly parts relating to engine operation, the bucket claws, front pins, and bushings are mainly parts relating to excavation work, the turn system transmission oil and turn system transmission seals are mainly parts relating to the turn operation, and the travel system transmission oil and travel system transmission shoes are main related to travel. According to the conventional method of detection of the operating time, normally the driving time of the engine was added up and used as the operating time, but strictly speaking this differs from the actual operating time. That is, even if the engine has been driven, unless excavation work has been performed, there is almost no effect on the wear or biting of the front pins and front bushings. The same applies to the other parts relating to travel and turning. Therefore, the maintenance monitor of the above prior art called for replacement at a stage when there was still leeway before the replacement time and therefore resulted in waste. Conversely, if able to determine the accurate time of operation of a hydraulic excavator, that is, the actual operating time, it would be possible to provide maintenance information to the user at the optimum timing and therefore possible to improve service.

Further, normally hydraulic excavators etc. are deployed at the construction sites. Maintenance (upkeep, management, and maintenance for the state of the machines) is important for such hydraulic excavators to perform work under tough environments or conditions. In the past, for such maintenance, service workers went to the construction sites and checked predetermined items using check-sheets prepared in advance.

In the conventional method of maintenance, the check data obtained by the service workers was managed by maintenance and management companies (run by manufacturers, dealers, or rental companies). The system was not set up to give sufficient maintenance information regarding the machinery used to the user side. Further, from the viewpoint of management, there were the problems that even the manufacturers, dealers, and rental companies were not able to obtain maintenance information in real time for machinery present at distant construction sites and that maintenance information was not being collected and managed in an easy-to-use format.

An object of the present invention is to provide a method of detection of the actual operating time of machinery deployed at construction sites which enables the actual time of work in construction machines such as hydraulic excavators to be grasped with a high degree of accuracy and parts to be replaced at the optimal timing and which is useful from various viewpoints in maintenance or labor management of the operators.

Another object of the present invention is to provide a data collection and management system of machinery deployed at construction sites which collects and manages maintenance information by a daily report format for construction machines, uses the maintenance information in real time, and obtains maintenance information in a highly usable format.

Still another object of the present invention is to provide a base station for managing a large number of machinery deployed at construction sites at distant locations.

DISCLOSURE OF THE INVENTION

The method of detection of the actual operating time of machinery according to the present invention is configured based on the following routine to achieve the above objects.

This method of detection of the actual operating time is a method used for a system including machinery deployed at construction sites and a base station and configured to enable transfer of information between the machinery and base station through a communication line. Each machinery is provided with a storage unit, a control unit receiving as input a quantitative machine status for work operations (quantitative status of the machinery), and a communications device enabling communication with an outside unit present at a distant location. The base station is provided with a communications device enabling communication with an outside unit present at a distant location, a center server for identifying a serial number of machinery and transferring information with its control units (hereinafter referred to as the "management server"), and a database managed by the management server and storing information for each model of the machinery and information relating to the operation for each machinery (serial number). Each control unit of the machinery and the management server of the base station are configured to transfer information through the various communications devices and a communication line.

In the above system configuration, each control unit measures the duration by which a quantitative machine status satisfies a predetermined condition, stores it in the storage unit, and transmits the measurement data of the duration to the management server of the base station. On the other hand, the management server receives the measurement data of the duration and calculates the cumulative operating time. The measurement data of the duration is preferably transmitted to the management server of the base station conditional on the power input key (engine key) being in the off position.

The above method of detection of the actual operating time does not simply use the drive time of the engine of the machinery etc. and deem it to be the operating time, but uses the engine speed or another quantitative machine status, detects only the quantitative machine status which satisfies the actual operating state, measures that duration, stores it in the storage unit, and preferably sends it to the management server under a "key off" condition. By calculating the cumulative operating time there, it is possible to find the actual time of operation (actual operating time).

In the above method of detection of the actual operating time, as the above quantitative machine status, the engine speed, pump discharge pressure, operating pilot pressure, or a combination of the same is used. Predetermined conditions are set for each of these quantitative machine statuses. Due to this, it is possible to find the actual operating time of the engine, the time when a large load is applied in the hydraulic circuit, and the actual times of excavation, travel, turning, etc. and possible to obtain a grasp of the optimal maintenance time.

Further, predetermined data may be transmitted from the machinery to the base station using a data transmission capable mobile terminal. The mobile terminal may for example by prepared by the operator. The mobile terminal may read the measurement data of the duration stored in the storage unit of the machinery and transmit it to the management server of the base station. The above mobile terminal is preferably a mobile or cell phone.

The management server is characterized by calculating the cumulative operating time for each serial number of the machinery. The management server calculates the remaining period before maintenance based on the cumulative operating time for each serial number of the machinery and transmits data relating to the remaining period before maintenance through a communications device to the machinery. Further, the management server calculates the cumulative operating time for each part for each serial number of the machinery, performs statistical processing on the cumulative operating times of a large number of machinery to find an average cumulative operating time, and transmits replacement time information for each part to each of the large number of machinery.

Next, the data collection and management system of machinery according to the present invention is configured as follows to achieve the above object.

The data collection and management system is comprised, in the same way as above, by machinery deployed at construction sites located at distant locations and a base station. Each machinery is provided with a control unit for receiving as input a quantitative status of the machinery and various event data and storing them in a storage unit and communications device enabling communication with an outside unit present at a distant location. The base station is provided with a communications device enabling communication with an outside unit located at a distant location, a management server for identifying the serial number of machinery and transferring information with the control unit of that machinery, and a database managed by the management server and storing information for each model of machinery and information for each serial number. Each control unit of the machinery and the management server of the base station are configured to be able to transfer information through the communications devices and a communications line. Further, the quantitative machine status and various event data stored in the storage unit of the machinery are sent to the base station. The management server of the base station stores the quantitative machine status and the various event data in the database in a predetermined format.

In the above configuration, preferably the predetermined format is a daily report format. The quantitative machine status and various event data are transmitted through the above communications line using a telecommunications satellite from machinery to the base station in the form of an e-mail attachment. Further, the quantitative machine status and various event data can be downloaded to a portable PC to be sent from the machinery to the base station through the Internet or a dedicated line.

In the above configuration, preferably the user, dealer, or other information user can use a computer terminal to access the management server of the base station and obtain delivery of the above data managed in the above predetermined format at the database by e-mail.

Further, the quantitative machine status and various event data can be transmitted from the machinery to the base station through the Internet or a dedicated line by a data transmission capable mobile phone.

Further, the management server calculates the cumulative data of various times based on the quantitative machine status and various event data of the daily report format of each of a large number of machinery. Further, the management server performs statistical processing on the cumulative data of various times for each serial number of the machinery to find an average value and transmits the replacement time information for the parts to each of the large number of machinery.

Next, the base station according to the present invention is configured as follows.

The base station is a base station for managing individually or all together the work capabilities of a large number of machinery deployed at construction sites. This base station is provided with a communications device for communicating with the communications device provided at each of the large number of machinery, a management server for identifying the serial number of each of the large number of machinery and transferring information with the control unit of the machinery through the communications device, and a database managed by the management server and storing information for each model of the machinery and information relating to the operation of each machinery.

In the above configuration, the management server calculates the cumulative operating time for each serial number of the machinery. The management server can calculate the remaining period before maintenance based on the cumulative operating time for each serial number of the machinery and transmit data relating to the remaining period before maintenance through the communications device to the machinery. Further, the management server can calculate the cumulative operating time of each part for each serial number of the machinery, perform statistical processing on the cumulative operating times of a large number of machinery to find the average cumulative operating time, compare this average value with the cumulative operating value of individual machinery, and transmit replacement time information for each part to each of the large number of machinery.

Further, the management server can calculate the cumulative data of various times based on the quantitative machine status and various event data of the daily report format of each of the large number of machinery. The management server performs statistical processing on the cumulative data of the various times for each serial number of the machinery to find the average value and transmits replacement time information for each part to each of the large number of machinery.

Further, the base station is provided with a web server (external house server). This web server is provided with a home page for transmitting the above data in response to access from users using each of the large number of machinery or notifying the replacement time information of each part. Further, the above data or replacement time information of each part can be sent by e-mail with attached report files.

BEST MODE FOR CARRYING OUT THE INVENTION

Next, preferred embodiments of the present invention will be explained with reference to the attached drawings.

Figure 1:
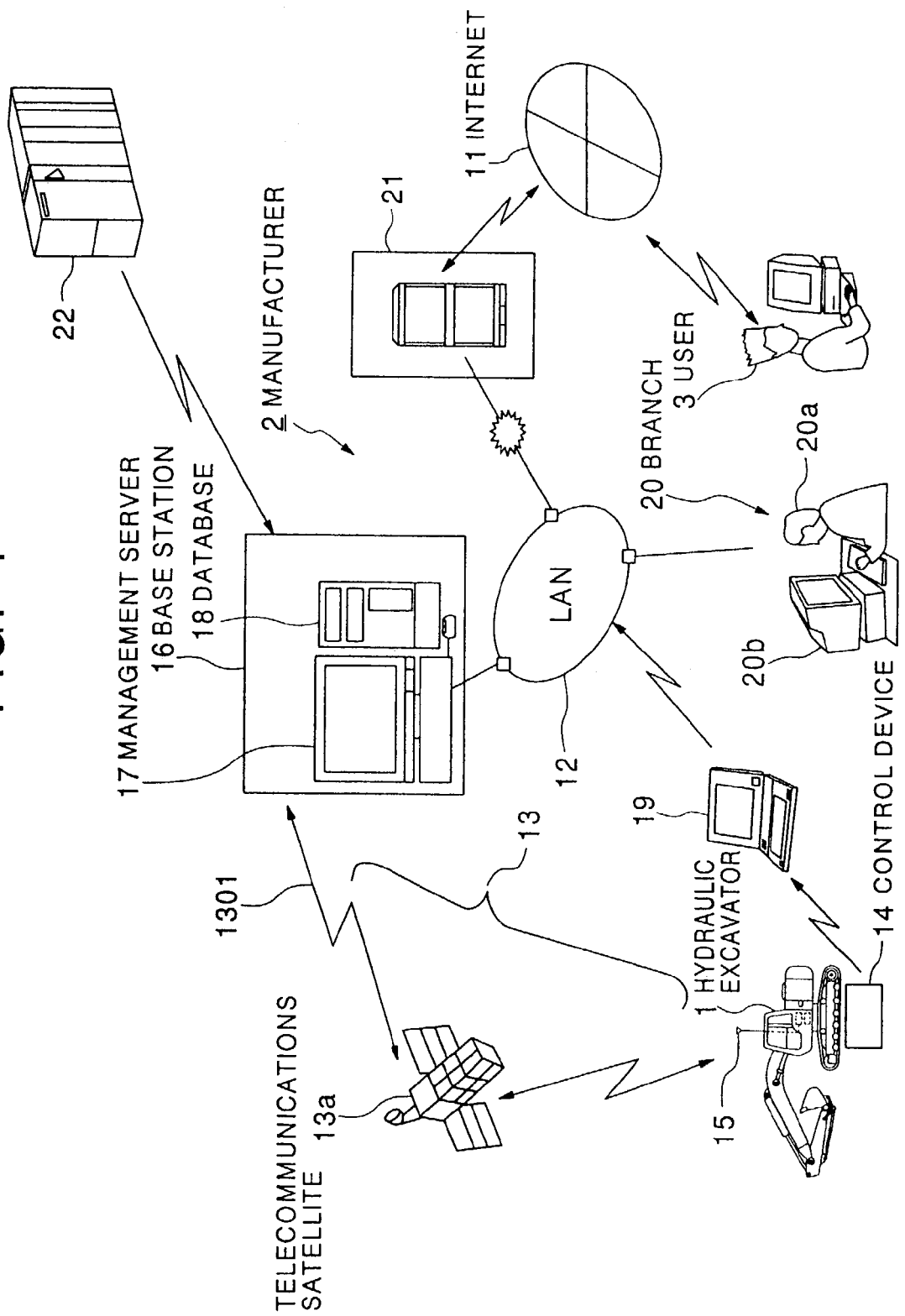
FIG. 1 is a view of the overall system configuration to which the present invention is applied.
Figure 2:
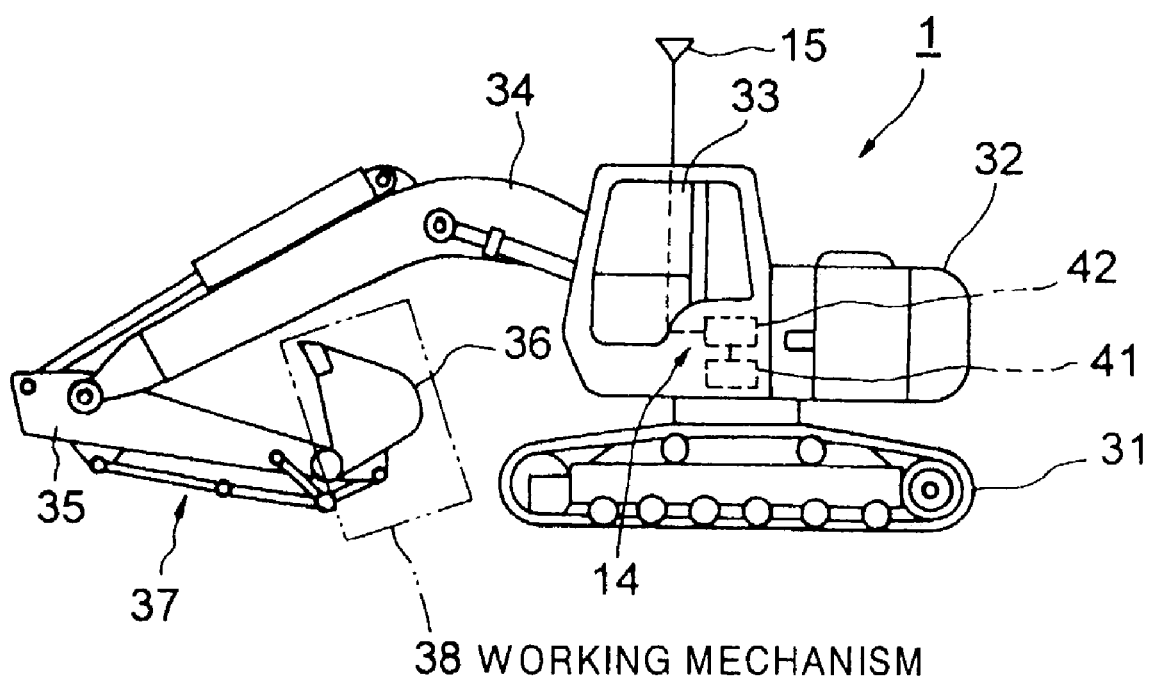
FIG. 2 is a side view of a hydraulic excavator as an example of machinery to which the present invention is applied.

FIG. 1 schematically shows the configuration of the overall system to which the present invention is applied. In this embodiment, the example of a hydraulic excavator 1 is shown as the machinery. As elements forming this overall system, a manufacturer 2 making and selling the hydraulic excavator 1 and a user 3 using the hydraulic excavator 1 are shown. In the above overall system, the hydraulic excavator 1 is deployed at the construction site or its vicinity. The manufacturer 2 and user 3 are located at positions spatially or geographically separated from the hydraulic excavator 1. In this overall system, IT (information technology) is actively used for connecting the hydraulic excavator 1, the manufacturer 2, and the user 3. The Internet 11, an in-house LAN 12, and a communication line 13 using a telecommunications satellite 13a are provided. In the hydraulic excavator 1, a control device 14 comprised by a computer and a communications device including an antenna 15 are provided. In the configuration of this embodiment, as shown in FIG. 2, the communications device is included in the control device 14. In the manufacturer 2, a base station 16 is provided. This base station 16 has a management server 17 and database 18 arranged in it. The management server 17 is positioned at the center of this system and functions as the center server. A control device 14 of the hydraulic excavator 1 deployed at a construction site and the base station 16 of the manufacturer 2 are connected to enable regular or irregular transfer of the necessary information (or data) through a download using a laptop computer (portable PC) 19 used by the service manager and the in-house LAN (dedicated line) 12 or through a communication line 13.

Here, the data sent from the hydraulic excavator 1 side to the base station 16 is a quantitative machine status (a quantitative status of the machinery) relating to the work operation of the hydraulic excavator 1 or data relating to various events arising at the hydraulic excavator 1.

In the above configuration, the data can further be transferred between the hydraulic excavator 1 and the base station 16 using a mobile terminal able to transmit data, typically a mobile phone. The mobile terminal or mobile phone is connected through the Internet or a dedicated line in a state able to transmit data with the management server 17 of the base station 16.

The information or data occurring at the hydraulic excavator 1 is all sent to the management server 17 of the base station 16 where it is processed and stored in a predetermined format. The management server 17 transmits information as required for information (data) sent from the hydraulic excavator 1. The data on the operating state or set state of the hydraulic excavator 1 is stored and managed in the database 18.

The manufacturer 2 is connected with a branch 20 through the in-house LAN 12. Therefore, a sales manager or service manager 20a in the branch 20 can access the management server 17 and database 18 using an input terminal 20b deployed there and can search for, extract, and use data required in work regarding troubleshooting or quality assurance information. Further, the manufacturer 2 is provided with an external house server 21 connected to the in-house LAN 12.

It can use this external house server 21 to provide necessary information to the user (or dealer etc.) 3 through the Internet 11 and make various proposals relating to the method of use and replacement of parts and other maintenance of the hydraulic excavator. On the other hand, the user 3 side can positively access the Internet 11, external house server 21, or management server 17 by a terminal to obtain the maintenance information needed.

More specifically, the above external house server 21 is constructed as a web server. The external house server 21 is comprised as part of the base station 16. The external house server 21 has a home page and displays or provides necessary information through the home page to the user 3, branch 20, other place of business, third parties, etc. The user 3 etc. can access the home page of the external house server 21 through the Internet and obtain information on the replacement time of parts at the hydraulic excavator owned.

Note that the management server 17 of the base station 16 is connected to a computer 22 storing separately provided test data (repair and inspection information and part replacement information). The data stored in the computer 22 is also suitably downloaded to the management server 17 and stored in the database 18.

In this configuration, instead of the manufacturer 2, a company resembling it may also operate the base station 16 provided with the management server 17, the database 18, and external house server 21. As such a resembling company, there are dealers, rental companies, leasing companies, used machinery sales and management companies, etc.

FIG. 2 shows an enlarged side view of the above hydraulic excavator 1. The hydraulic excavator 1 is provided with an under traveling carriage 31 traveling by a hydraulic motor, a turning structure 32 at which the engine, hydraulic pump, hydraulic piping, power source battery, operator's cab 33, etc. are arranged, and a front mechanism 37 comprised of a boom 34, arm 35, and bucket 36. The bucket 36 is a working mechanism 38 and is a portion switched and modified freely by the user in accordance with the work. In this hydraulic excavator 1, for example, the above control device 14 and antenna 15 are provided at the location of the operator's cab 33. The control device 14 is comprised of a main controller 41 and communications device 42.

Figure 3:
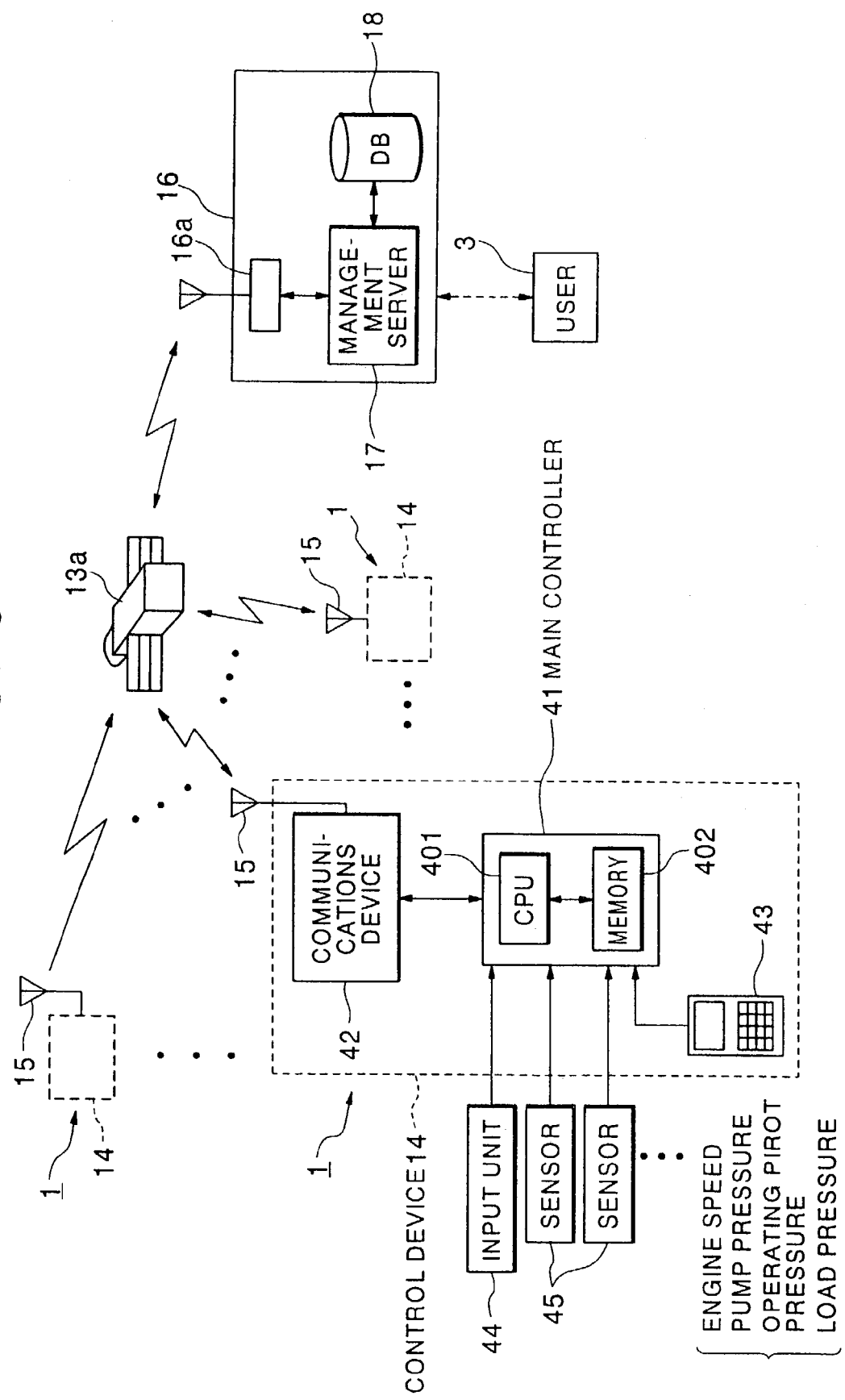
FIG. 3 is a view of the system configuration schematically showing the key parts of a system to which the present invention is applied.

FIG. 3 is a view schematically showing the relation between the hydraulic excavators 1 deployed at a large number of construction sites and the base station 16. The control device 14 of each hydraulic excavator 1 is provided with a main controller 41, communications device 42, and antenna 15. The base station 16 is provided with a communications device 16a, management server 17, and database (DB) 18. The main controller 41 has connected to it, in accordance with need, a key pad 43 for giving information to the main controller 41. Further, the main controller 41 receives as input signals regarding various quantitative machine statuses or event data from the input unit 44, a plurality of sensors 45 provided at different parts of the hydraulic excavator 1, and a plurality of output generators 47 such as alarm devices generating various events. Each of the control devices 14 of the large number of hydraulic excavators 1 shown in FIG. 3 and the management server 17 of the base station have formed between them a communication line by a telecommunications satellite 13a for the transfer of information.

Further, in FIG. 3, the relation of the transfer of information between the base station 15 and a user 3 through the external house server 21 and a communications line comprised of the Internet 11 etc. as explained in FIG. 1 is shown.

Note that in FIG. 1, the configuration for transmitting data from the laptop computer 19 through the in-house LAN 12 to the management server 17 of the base station 16 is also shown.

Figure 4:
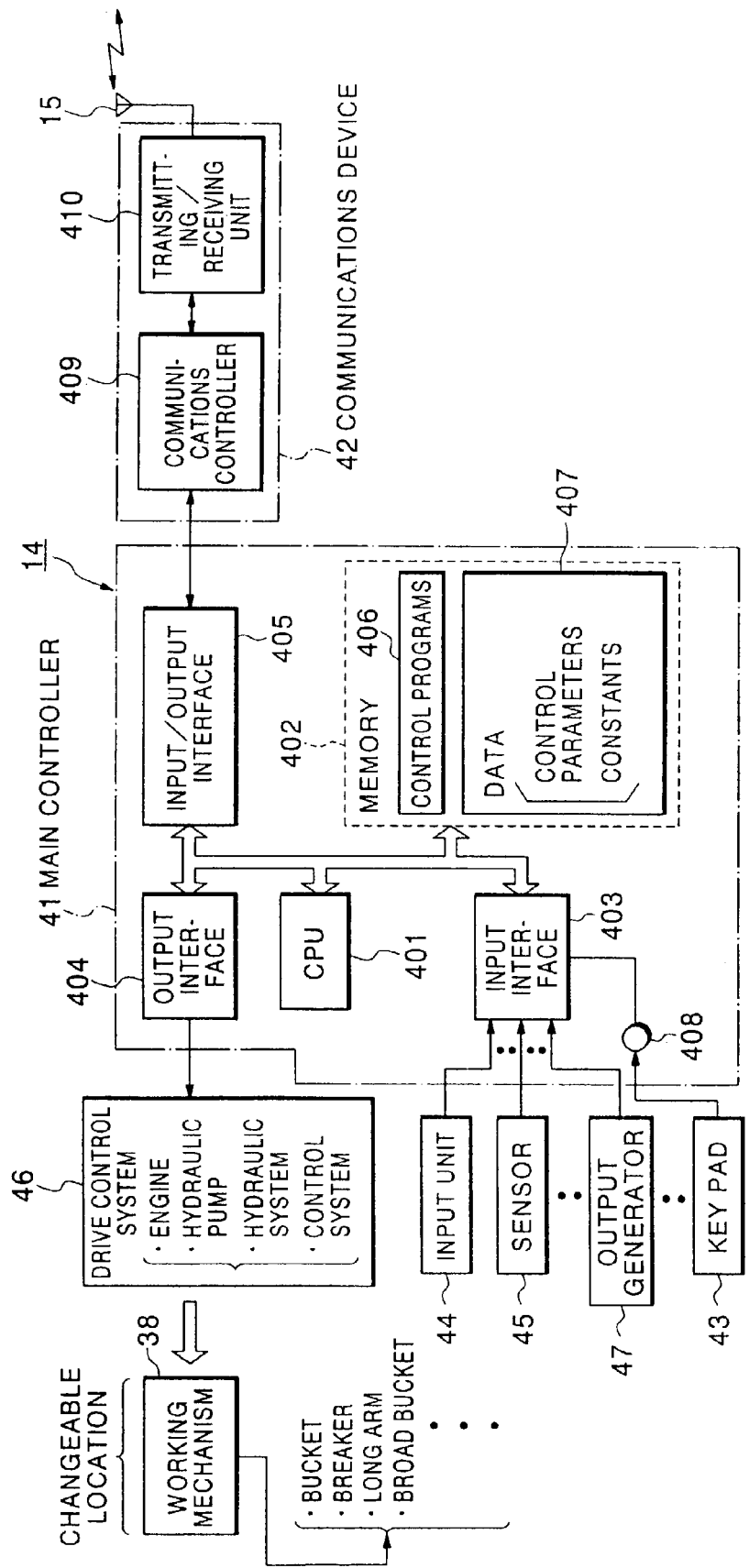
FIG. 4 is a block diagram of the internal configuration of a main controller etc. for realizing the present invention and the configuration of the peripheral parts.

Next, the internal configurations of the main controller 41 and communications device 42 and the configuration of their peripheral parts will be explained with reference to FIG. 4. The main controller 41 is provided with a CPU (central processing unit) 401, memory 402, input interface 403, output interface 404, and input/output interface 405. The memory 402 stores a plurality of control programs 406 for various work operations, various types of data 407, etc.

The data 407 includes the data (control parameters and constants) necessary for control of the work operations, the data of the quantitative machine status (engine speed, pump pressure, operating pilot pressure, load pressure, travel time, turning time, excavating time, etc.) generated at the time of the work operation, various event data output by the alarm devices and other output generators, etc.

The input interface 403 receives as input signals output from the input unit 44 on the control panel provided in the operator=s cab 33 and the plurality of sensors 45 provided at different parts of the hydraulic system or electrical system etc. of the hydraulic excavator 1. The signals from the sensors 45 are signals relating to quantitative machine statuses. The signals from the output generators 47 are signals relating to various events. Further, the input interface 403 has a connection terminal 408. The above-mentioned key pad 43 is connected in accordance with need to this connection terminal 408. It is also connected to the above communications device 42 through the input/output interface 405. The communications device 42 includes a communication controller 409 and transmitting/receiving unit 410. The drive control system 46 is connected through the output interface 404. The CPU 401 gives instruction values for instructing operations or setting values to the drive control system 46. The operation of the drive control system 46 is controlled based on these instruction values or setting values. The bucket 36 or other working mechanism 38 provided at the front end of the front mechanism 37 is made to perform the operations necessary for the work.

Note that as the working mechanism 38, there are a breaker, long arm, broad bucket, etc. in addition to the bucket. The working mechanism 38 is freely attached and detached to and from the front mechanism in accordance with the required work and used as an attachment. The working mechanism 38 is normally provided by the manufacturer as a standard attachment for each model. Further, for the working mechanism 38, in some cases parts nonstandard to the manufacturer are attached and used depending on the situation of the user. As explained above, the working mechanism 38 of the hydraulic excavator 1 is a location where modification is allowed.

In the above, as the quantitative machine statuses input from the sensors 45 to the main controller 41, there are at least the engine speed, pump pressure, operating pilot pressure (front, turn, travel), and load pressure. These quantitative machine statuses input to the main controller 41 are suitably selected and used for calculation of the actual operating time in the CPU 401 of the main controller 41 as explained later.

Figure 5:
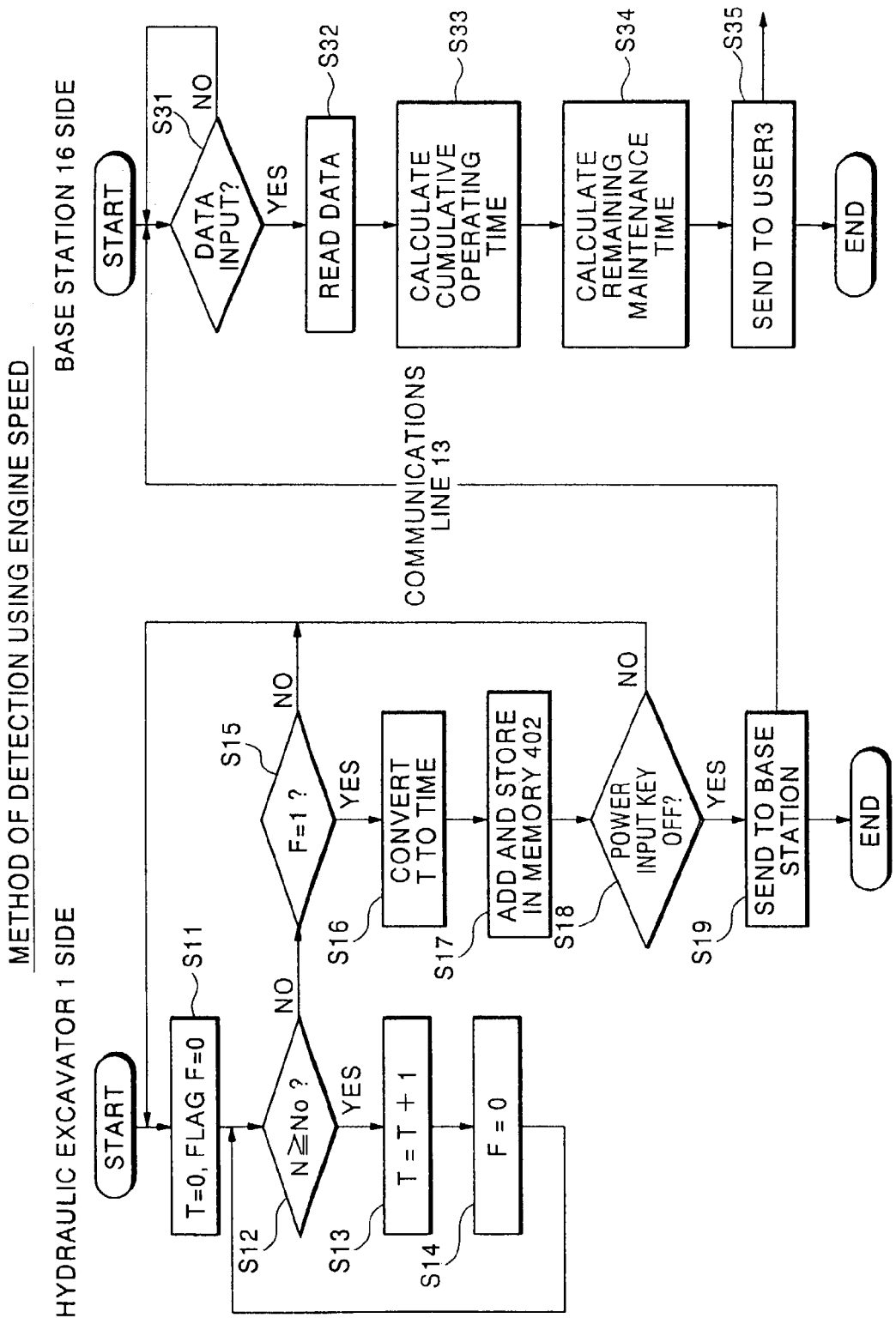
FIG. 5 shows flow charts of a basic embodiment of a method of detection of the actual operating time of machinery according to the present invention.

Next, a basic embodiment of the method of detection of the actual operating time of machinery will be explained based on the above system configuration with reference to FIG. 5. FIG. 5 shows flow charts of the operations at the hydraulic excavator 1 side and base station 16 side and the relationship of transfer of information using communication lines 13 between the flow charts.

The flow charts shown in FIG. 5 will be explained. In the method of detection shown in FIG. 5, the engine speed is used for detection of the actual operating time.

In FIG. 5, first the operation at the hydraulic excavator 1 side will be explained. At the first step S11, the variable T for measurement corresponding to the actual operating time and the flag F are set to 0. At the next judgement step S12, the engine speed (N) input to the main controller 41 is compared with a preset specific engine speed $N_0$. When N is larger than or equal to $N_0$, the variable T is incremented by exactly "1" at step S13. Further, at the next step S14, the flag F is set to "1". Next, the routine proceeds to the upstream side of the judgement step S12. So long as the condition that the engine speed N is larger than or equal to $N_0$ is satisfied, the steps S12 to S14 are repeated and the value of the variable T is increased. In this state, the condition given at the judgement step S12 means that the hydraulic excavator 1 is actually operating, so means that the actual operating time is being measured. This is based on the fact that so long as the condition given at the judgement step S12 as the operation of the flow chart is satisfied, the time when the condition continues is the actual time of operation. When the engine speed N becomes smaller than the specific engine speed $N_0$ at the judgement step S12, the routine proceeds to the next judgement step S15. At the judgement step S15, it is judged if the flag F is 1 or not. When F=1, the actual operating time has been measured, so the value of T showing the actual operating time is converted to time (step S16). The time obtained by the calculation processing is added to and stored in the memory 402 as the actual operating time (step S17). At the next judgement step S18, it is judged if the power input key (engine key) maintaining the operating state of the hydraulic excavator 1 is in the off position. When the power input key is not in the off position, the routine returns to the initial step S11. When the power input key is in the off position, the data of the actual operating time stored in the memory 402 is transmitted through the communications device 42 and the communication line 13 to the base station 16 (step S19).

On the other hand, at the base station 16 side, at the judgement step S31, it is constantly judged at if there has been input of data relating to the actual operating time from the hydraulic excavator 1 side. When there is no data input, the judgement is only repeated. When there has been input of data, that data is read (step S32). At the next step, the cumulative operating time is calculated as the actual operating time (step S33). The database 18 of the base station 16 records and manages data of the maintenance time for each serial number of the hydraulic excavators 1 in advance, so using this data, the management server 77 calculates the remaining time to maintenance of the hydraulic excavator 1 sending the data of the actual operating time to the base station 16 side (step S34). The remaining time to maintenance is extremely important information for the user 3 using the hydraulic excavator 1. Therefore, at step S35, as explained in FIG. 1, the Internet 11 etc. is used to transmit to the user 3 the actual operating time, remaining period before maintenance, part replacement times, and other information.

The user 3 uses the above actual operating time and other information to judge the replacement time for the various consumable parts used in the hydraulic excavator 1, especially the parts directly related to engine operation, and replace the parts.

Next, another embodiment of the method of detection of the actual operating time of machinery will be explained with reference to FIG. 6. This embodiment detects the operating pilot pressure for excavation and detects the actual excavation time. The overall configuration etc. are similar to the above embodiment. The flow of operation at the hydraulic excavator side will be explained.

Figure 6:
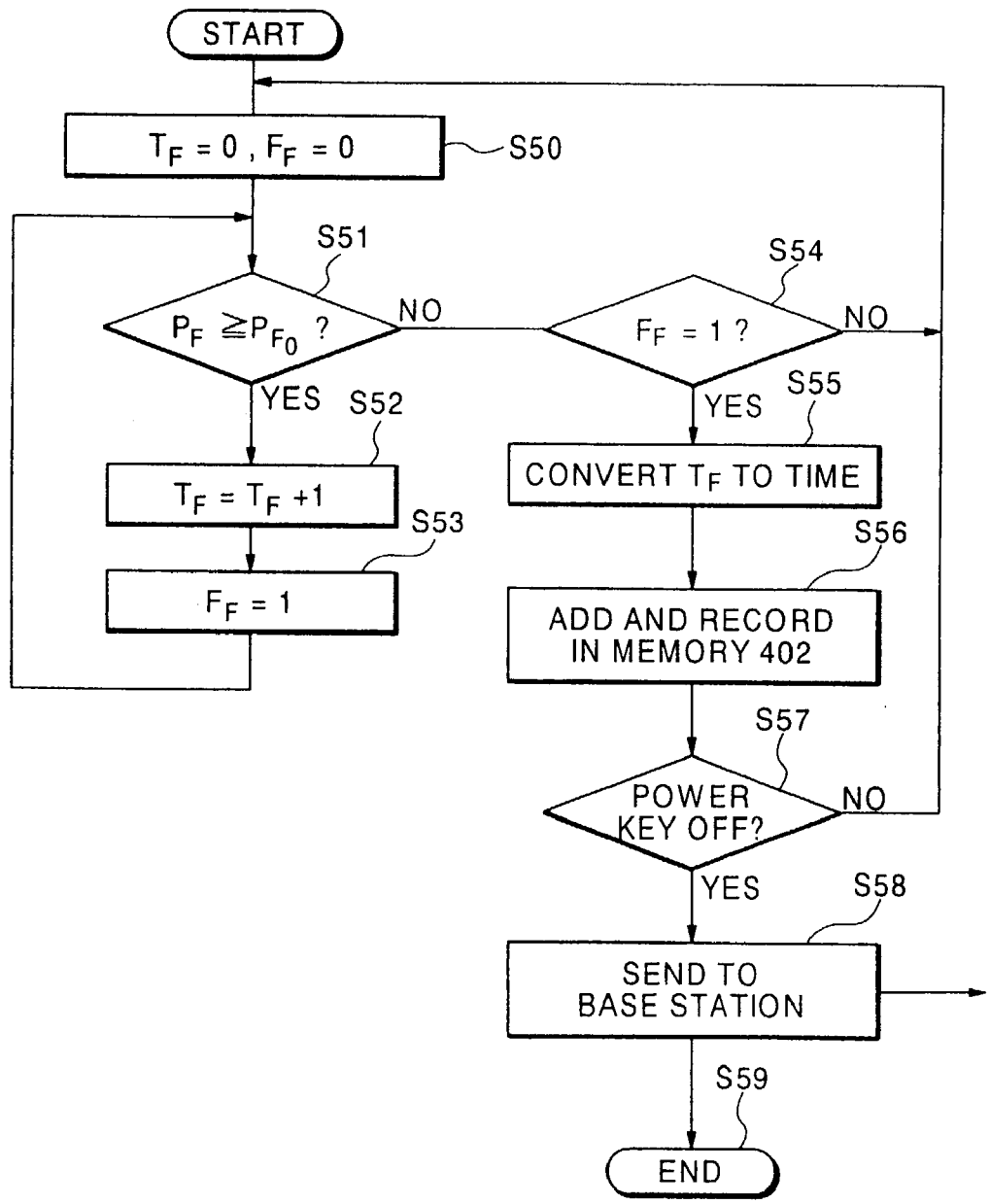
FIG. 6 is a flow chart of another embodiment of a method of detection of the actual operating time of machinery according to the present invention.

In FIG. 6, at the first step S50, the variable $T_F$ for measurement corresponding to the actual operating time and the flag $F_F$ are set to 0. At the next judgement step S51, the operating pilot pressure ($P_F$) of the boom, arm, and bucket in the operating pilot pressures input to the main controller 41 is compared with a preset specific pilot pressure $P_{F0}$. When $P_F$ is larger than or equal to $P_{F0}$, the variable $T_F$ is incremented by exactly "1" at step S52. Further, at the next step S53, the flag $F_F$ is set to "1". Next, the routine proceeds to the upstream side of the judgement step S51. So long as the condition that the pilot pressure $P_F$ is larger than or equal to $P_{F0}$ is satisfied, the steps S51 to S53 are repeated and the value of the variable $T_F$ is increased. In this state, the condition given at the judgement step S51 means that the hydraulic excavator 1 is actually operating, so means that the actual operating time of excavation is being measured. This is based on the fact that so long as the condition given at the judgement step S51 as the operation of the flow chart is satisfied, the time when the condition continues is the actual time of operation. When the pilot pressure $P_F$ becomes smaller than the specific pilot pressure $P_{F0}$ at the judgement step S51, the routine proceeds to the next judgement step S54. At the judgement step S54, it is judged if the flag $F_F$ is 1 or not. When $F_F$=1, the actual operating time of excavation has been measured, so the value of $T_F$ showing the actual operating time of excavation is converted to time (step S55). The time obtained by the calculation processing is added to and stored in the memory 402 as the actual operating time (step S56). At the next judgement step S57, it is judged if the power input key (engine key) maintaining the operating state of the hydraulic excavator 1 is in the off position. When the power input key is not in the off position, the routine returns to the initial step S50. When the power input key is in the off position, the data of the actual operating time stored in the memory 402 is transmitted through the communications device 42 and the communication line 13 to the base station 16 (step S58). The rest of the processing at the base station 16 is similar to the case of the above basic embodiment, so the explanation will be omitted.

According to the above second embodiment, it is possible to find the actual operating time of excavation, in particular it is possible to accurately find the replacement time for parts (front pins, bushings) related to excavation work of the front.

According to the above embodiment of the method of detection of the actual operating time, whether using the pump discharge pressure or operating pilot pressure, by setting similar conditions (at least predetermined pressure, at least predetermined time, etc.), it becomes possible to find the actual time of operation of the hydraulic excavator, that is, the actual operating time.

Note that as the condition for measuring the actual operating time, it is also possible to use the time during which an operating lever is used etc.

Further, as a method of management of the data relating to the actual operating time of the hydraulic excavator or maintenance at the base station 16 side, most preferably the data on the actual operating time is stored and managed for each serial number of all hydraulic excavators 1. Due to this, based on statistical processing, for example, it becomes possible to obtain information on the maintenance time for the working oil etc., the optimal part replacement time, etc. for each model, each serial number, and each part. This is extremely useful for maintenance service provided to the users later.

As the above statistical processing at the management server 17, preferably the cumulative operating time of each part of each hydraulic excavator is calculated, the average cumulative operating time of the cumulative operating times of a large number of hydraulic excavator is found, and replacement time information of each part is sent to each of the large number of hydraulic excavators. The users are informed of the replacement time of each part in this way.

The replacement time of a part may be reported to a user as explained above through display on the home page of the external house server 21 or using e-mail attaching a report file. Further, when trouble is discovered, it is quickly informed to the user by e-mail.

Since the management server 17 side can calculate the cumulative operating time, it is possible to store data relating to the cumulative time for the operating times of the individual hydraulic excavators at the base station 16 side as backup.

In the above embodiment, the explanation of application of the method of detection of the actual operating time to a hydraulic excavator was explained, but the machinery is not limited to this. Further, the above hydraulic excavator was an excavator of an electronic control system using control programs, but of course the method of detection of the actual operating time according to the present invention can also be applied to a non electronic control system machinery. Further, in the above embodiment, the information was sent from the hydraulic excavator to the base station conditional on the power input key being in the off position, but the invention is not limited to this. This transmission is preferably normally performed late at night or at other times when there is little communication traffic, so it is preferable that the power input key be in the off position.

Figure 7:
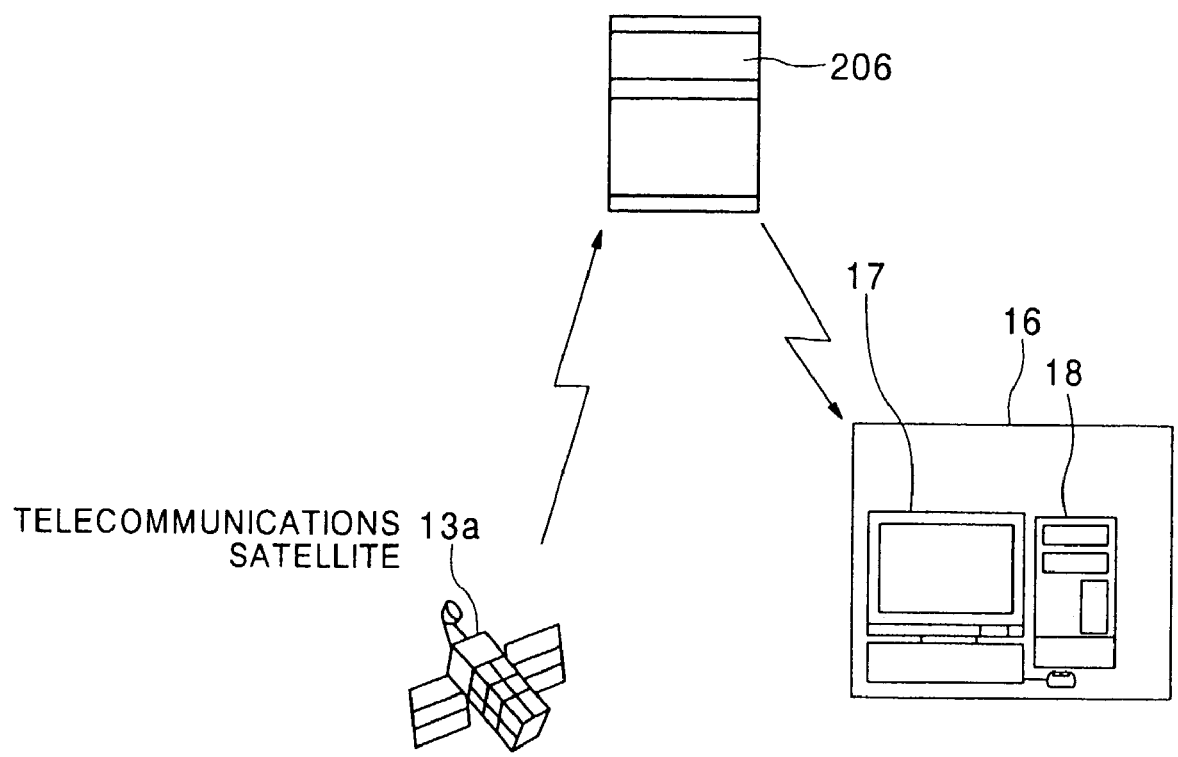
FIG. 7 is a view of the configuration of a communication line showing an e-mail server used in the data collection and management system of machinery according to the present invention.

Next, a data collection and management system of hydraulic excavators 1 deployed at construction sites will be explained with reference to FIG. 7 to FIG. 9.

The memory 402 of the main controller 41 of each hydraulic excavator 1 stores data input from the above sensors 45 or output generators 47 in a predetermined format. As the data, as explained above, there is the data of the quantitative machine statuses (engine speed, pump pressure, operating pilot pressure, load pressure, travel time, turning time, excavating time, etc.) generated at the time of the work operation, various event data output by the alarm devices and other output generators, etc.

Figure 9:
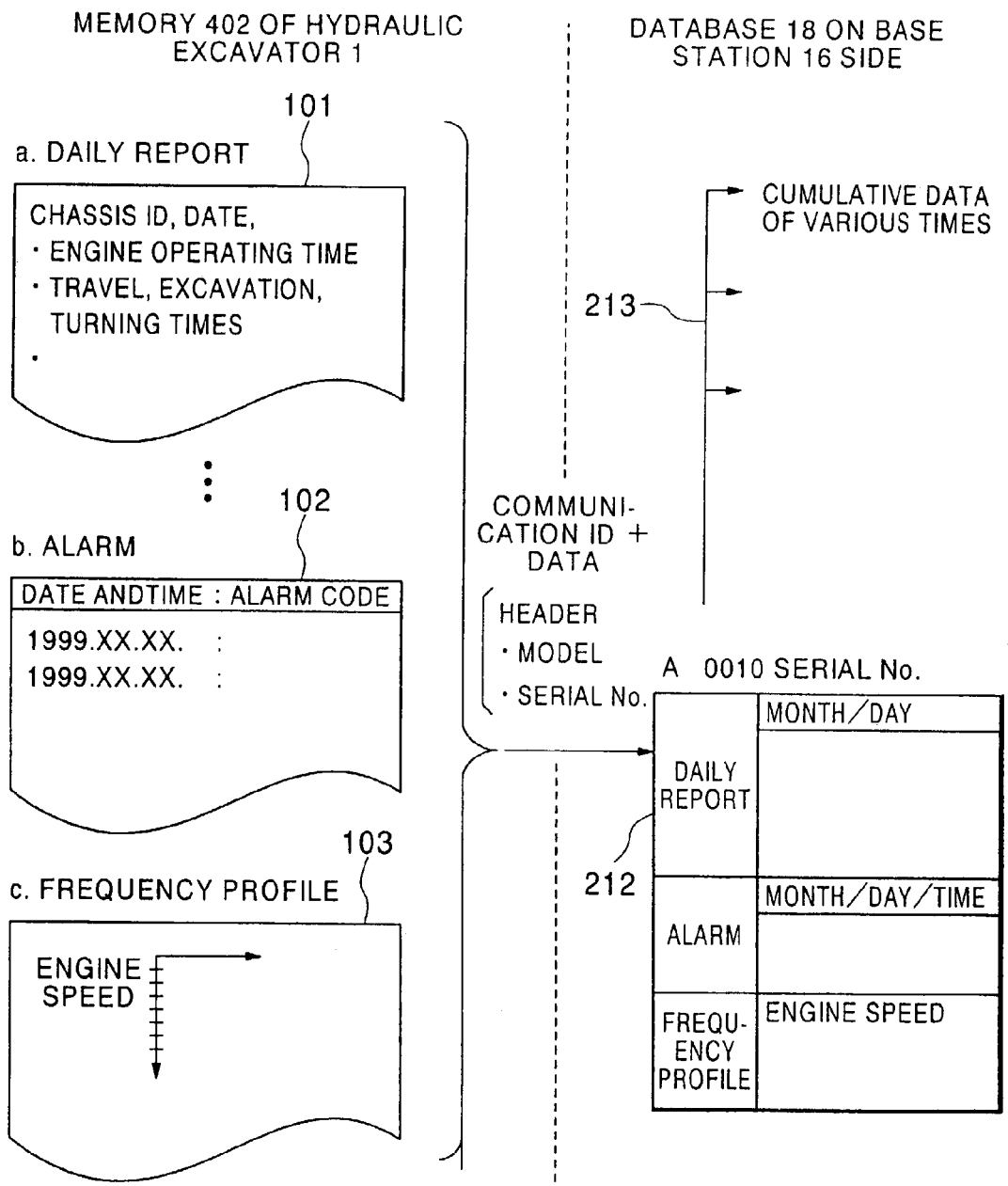
FIG. 9 is a view explaining an example of the data structure in a data collection and management system of machinery according to the present invention.

The left region in FIG. 9 shows an example of the structure of the data stored in the memory 402 of a hydraulic excavator 1. The memory 402 includes the a. daily report data 101, b. alarm data 102, and c. frequency profile data 103. The daily report data 101 includes the chassis ID specifying the hydraulic excavator 1, the date of the daily report, the engine operating time (engine speed, pump pressure, etc.), and data relating to the travel, excavation, and turning times. Note that the travel, excavation, and turning times can be detected by detecting for example the time during which each operating lever is operated or the rise in the pilot pressure in the hydraulic system accompanying operation and finding the time at over a predetermined pressure. The daily report data 102 is stored in units of days. The alarm data 102 is data managing and recording alarm signals output from the alarm devices provided at different parts of the body of the hydraulic excavator 1, that is, the output generators 47. The frequency profile data 103 prepares and stores the profile of the state of occurrence for each speed in for example a state of fluctuation of the engine speed.

The data 101, 102, and 103 generated and organized by the data processing function of the CPU 401 and stored in the above format in the memory 402 of the main controller 41 is sent to the management server 17 at the base station 16 side regularly or irregularly and managed and stored in the database 18. Data is regularly transmitted, as shown in FIG. 1, every day through a communication line 13 using the telecommunications satellite 13a using times of low communication traffic such as late at night. Data is sometimes irregularly transmitted, similarly as shown in FIG. 1, by a service manager going to the construction site and using his laptop PC 19 to download data and send data back through the Internet 11. Many of the construction sites where hydraulic excavators 1 are deployed are in locations in harsh environments around the world. Normally, data is assumed to be transmitted regularly using communication lines 13 for the purpose of obtaining data in real time. Data is irregularly transmitted for example several times a year by overseas dealers.

Figure 8:
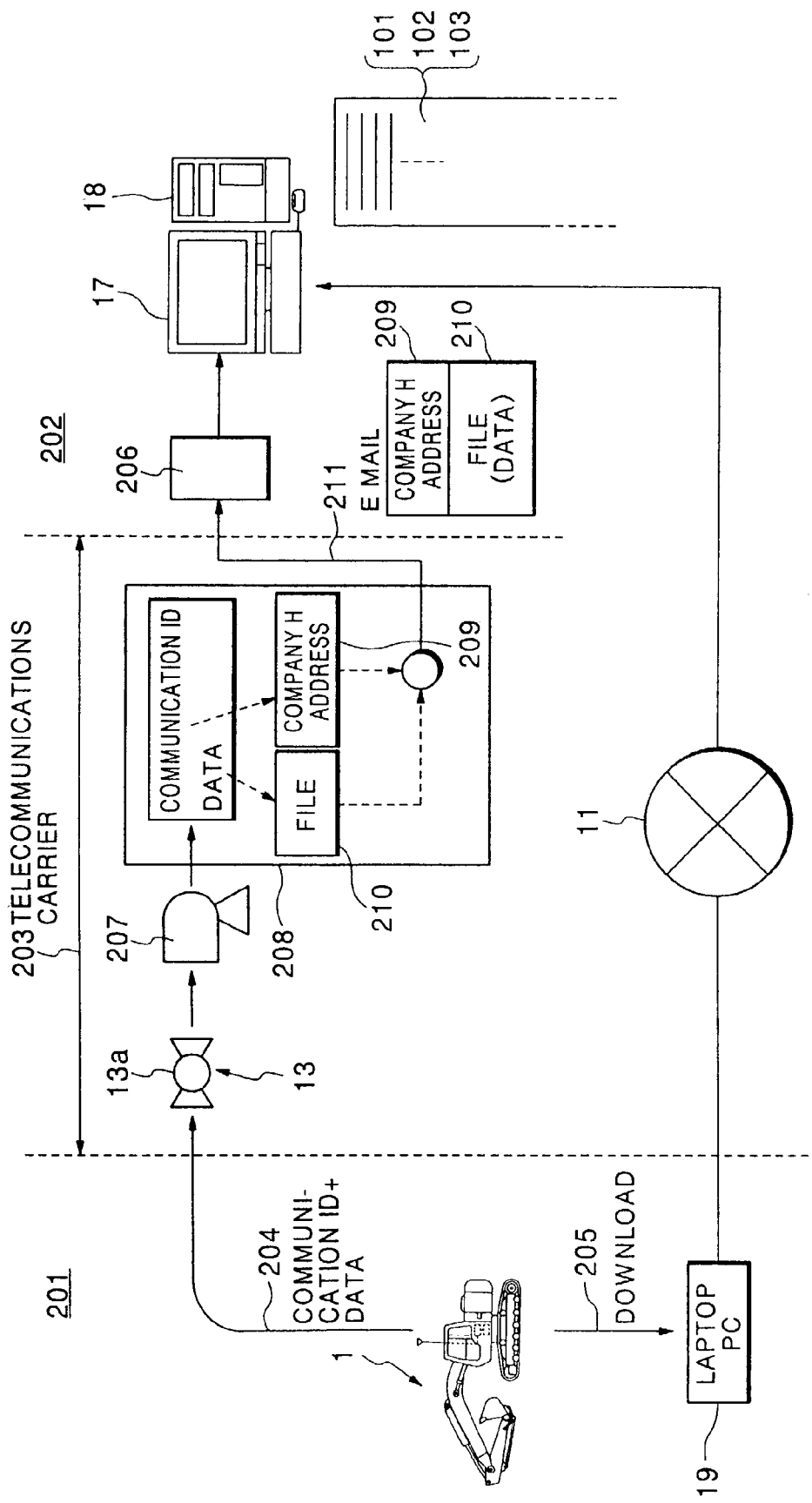
FIG. 8 is a view of the configuration of a data transmission route in a data collection and management system of machinery according to the present invention.

An example of the specific system for transmitting data from the hydraulic excavator 1 side to the management server 17 of the base station 16 is shown in FIG. 8. In FIG. 8, 201 is the region of the construction site, while 202 is the region of the base station 16 side. The section 203 between the region 201 and the region 203 is the section in which the telecommunications carrier is interposed in the case of the present embodiment.

In FIG. 8, in the hydraulic excavator 1, two routes 204 and 205 are shown as routes of data transmission. The route 204 is the data transmission route using a communication line 13, while the route 205 is a data transmission route using the laptop PC 19 and Internet 11. In the route 204, information is transmitted through the communications line 13 including the telecommunications satellite 13a and the section 203 of the telecommunications carrier to the management server 17 of the base station 16. In this case, as explained below, the data is sent using e-mail. Therefore, showing the portion 1301 of the communications line 13 shown in FIG. 1 in more detail, the result becomes as shown in FIG. 7. The data transmitted from the telecommunications satellite 13a is sent by the e-mail format and is received at the e-mail server 206.

Here, the data transmission at the route 204 will be explained with reference to FIG. 8. The main controller 41 of a hydraulic excavator 1 transmits the above data 101, 102, and 103 stored in the memory 402 toward the telecommunications satellite 13a through the communications device 42. At this time, the communication ID and data 101 to 103 are sent joined together. The communication ID and the data from the telecommunications satellite 13a are received by the receiving device 207 of the telecommunications carrier and divided into the communication ID and data by the processing device 208. The communication ID is converted to the address 209 of the corresponding destination company (Company H) from the conversion table in the database housed in the processing device 208. The data is converted to a file 210 as document data of the file format. Next, the Company H address 209 and the file 210 are joined and sent out as the e-mail 211. This e-mail 211 is delivered to the e-mail server 206 of the base station 16 in accordance with the address information of the Company H. Next, the management server 17 receives the e-mail 211 with the attached file 210 from the e-mail server 206. The management server 17 fetches the file 210, that is, the above data 101 to 103, from the e-mail 211 and stores it in the database 18.

The structure of the data sent from the hydraulic excavator 1 to the management server 17, shown more specifically, becomes as shown in FIG. 9. At the time of data transmission, the data of the model and serial number of the hydraulic excavator 1 is added as a header to the data 101 to 103. Therefore, when stored in the database 18 of the base station 16, the daily report, alarm, and frequency profile data are managed all together in the state with the model (for example A) and serial number (for example 0010) specified as shown by 212.

As explained above, at the base station 16 side, it is possible to use the route of the communications lines 13 etc. to regularly collect the above data from for example a large number of hydraulic excavators located at distant locations and manage the same at the database 18. In this case, the management server 17, as shown by 213 in FIG. 9, can use the collected data to add up the engine operating times, prepare cumulative data of various times, and otherwise process the data and perform statistical processing.

According to the above statistical processing by the management server 17, preferably the average value of the cumulative data of the various times for each serial number of the hydraulic excavators (machinery) is found. This average value and the cumulative value for individual hydraulic excavators can be compared to calculate the replacement time for each part in each of the large number of hydraulic excavators. By performing this statistical processing, each of the large number of hydraulic excavators can be notified of replacement time information for each part.

The data of the hydraulic excavators 1 etc. managed in the database 18 of the base station 16 in the above way can be provided to the user 3 through the Internet 11 in the processed state. The user 3 itself can also access the management server 17 and the database 18 to obtain the information necessary for maintenance.

That is, as explained above, as the means for informing the user of replacement time information for parts for different hydraulic excavators, there are the means of sending it through the home page of the external house server 21 of the base station 16 and the means of using e-mail with a report file attached.

In the above embodiment, an example of using the data collection and management system for hydraulic excavators was explained, but the machinery is not limited to this. Further, an example of an electronic control system using control programs was explained, but of course the present invention can also be applied to non electronic control system machinery.

As clear from the above explanation, according to the present invention, the time when a hydraulic excavator or other construction machine actually works, the engine operating time, the excavation, travel, and turning times, the time of high pump pressure, etc., that is, the actual operating time, can be grasped with a high degree of accuracy, parts can be replaced at the optimal timing, various advantages are given in maintenance, and the data can be used for labor management of the operators. Further, maintenance information can be collected and managed by the daily report format for hydraulic excavators and other construction machines, maintenance information can be used in real time, and maintenance information can be obtained by a highly usable format.

INDUSTRIAL APPLICABILITY

A base station is provided for hydraulic excavators etc. deployed at a large number of construction sites at distant locations. The base station obtains a grasp of the accurate operating time of the hydraulic excavators etc. A data collection and management system of machinery easy to use by a user, dealer, or other information user is constructed.

The invention claimed is:

1. A method of detection of the actual operating time of machinery characterized by being applied to a system including:

machinery each provided with a storage unit, a control unit receiving as input a quantitative machine status for work operations, and a first communications device enabling communication with an outside unit present at a distant location and deployed at a construction site;

a base station provided with a second communications device enabling communication with an outside unit present at a distant location, a center server for identifying a serial number of machinery and transferring information with said control unit, and a database managed by said center server and storing information for each model of said machinery and information relating to the operation for each machinery;

wherein said control unit of said machinery and said center server of said base station are configured to be able to transfer information with each other through said communications devices and a communication line;

wherein said control unit measures the duration where a quantitative machine status satisfies predetermined conditions corresponding to actual operations and stores it in the storage unit and transmits the measurement data of said duration to said center server of said base station;

said center server receives the measurement data of said duration and calculates the actual operating time of the machinery;

said center server calculates a cumulative operating time for each serial number of said machinery; and said center server calculates a cumulative operating time for each part for each serial number of said machinery, performs statistical processing on said cumulative operating times of said large number of machinery to find an average cumulative operating time, and transmits replacement time information for each part to each of said large number of machinery.

2. A method of detection of an actual operating time of machinery as set forth in claim 1, characterized by transmitting said measurement data of said duration to said base station conditional on a power input key being in an off position.

3. A method of detection of an actual operating time of machinery as set forth in claim 2, characterized by providing a data transmission capable mobile terminal, reading the measurement data of said duration stored in said storage unit by said mobile terminal, and transmitting it to said center server of said base station.

4. A method of detection of an actual operating time of machinery as set forth in claim 3, characterized in that said mobile terminal is a mobile phone.

5. A method of detection of an actual operating time of machinery as set forth in claim 1, characterized in that said quantitative machine status is an engine speed and the predetermined condition to be satisfied is an engine speed of at least a specific predetermined engine speed.

6. A method of detection of an actual operating time of machinery as set forth in claim 1, characterized in that said quantitative machine status is a pump discharge pressure and the predetermined condition to be satisfied is a pump discharge pressure of at least a specific predetermined pressure.

7. A method of detection of an actual operating time of machinery as set forth in claim 1, characterized in that said quantitative machine status is an operating pilot pressure and the predetermined condition to be satisfied is an operating pilot pressure of at least a specific predetermined pressure.

8. A method of detection of an actual operating time of machinery as set forth in claim 1, characterized in that said quantitative machine status is an amount defined by a combination of an engine speed, pump discharge pressure, and operating pilot pressure and the predetermined condition to be satisfied is a combination of the engine speed, pump discharge pressure, and operating pilot pressure.

9. A method of detection of an actual operating time of machinery as set forth in claim 1, characterized in that said center server calculates a remaining time to maintenance based on said cumulative operating time for each serial number of said machinery and transmits data relating to said remaining time to maintenance through said communications device to said machinery.

10. A data collection and management system of machinery including:
    machinery each provided with a control unit for receiving as input a quantitative status of the machinery relating to actual operation and various event data and storing them in a storage unit and a first communications device enabling communication with an outside unit present at a distant location and deployed at a construction site;
    a base station provided with a second communications device enabling communication with an outside unit located at a distant location, a center server for identifying a serial number of said machinery and transferring information with said control unit, and a database managed by said center server and storing information for each model of machinery and information for each serial number;
    wherein said control unit of each said machinery and said center server of said base station are configured to be able to transfer information through said communications devices and a communications line;
    the quantitative machine status relating to the actual operation and various event data stored in said storage unit of said machinery are sent to said base station;
    said center server of said base station stores the quantitative machine status and said various event data in said database in a predetermined format, and calculates cumulative data including actual operating time based on said quantitative machine status and said event data of a large number of machinery; and
    said center server performs statistical processing on the cumulative data of said various times for each serial number of said machinery to find an average value and transmits the replacement time information for each part to each of said large number of machinery.

11. A data collection and management system as set forth in claim 10, characterized in that said predetermined format is a daily report format.

12. A data collection and management system as set forth in claim 10, characterized in that the quantitative machine status and various event data are transmitted through said communications line using a telecommunications satellite from said machinery to said base station in the form of an e-mail attachment.

13. A data collection and management system as set forth in claim 10, characterized in said quantitative machine status and various event data are downloaded to a portable PC to be sent from a machinery to said base station through the Internet or a dedicated line.

14. A data collection and management system as set forth in claim 10, characterized in that said quantitative machine status and various event data are transmitted from said machinery to said base station through the Internet or a dedicated line by a data transmission capable mobile phone.

15. A data collection and management system as set forth in claim 10, characterized in that an information user uses a terminal device to access said center server of said base station and receives delivery by e-mail of said data managed by said predetermined format in said database.

16. A base station for managing individually or all together the work capabilities of a large number of machinery deployed at construction sites, said base station comprising:
    a communications device for communicating with a communications device provided at each of said large number of machinery;
    a center server for identifying the serial number of each of the large number of machinery and transferring information with the control unit of said machinery through said communications device;
    a database managed by said management server and storing information for each model of said machinery and information relating to the operation of each machinery;
    wherein said center server calculates a cumulative actual operating time for each serial number of said machinery; and
    said center server calculates the remaining period before maintenance based on said cumulative operating time of each part for each serial number of said machinery, performs statistical processing on said cumulative operating times of said large number of machinery to find the average cumulative operating time, and transmits replacement time information for each part to each of said large number of machinery.

17. A base station as set forth in claim 16, characterized in that said center server calculates the remaining period before maintenance based on said cumulative operating time for each serial number of said machinery and transmits data relating to the remaining period before maintenance through said communications device to said machinery.

18. A base station as set forth in claim 16, characterized in that said center server calculates cumulative data of various actual operating times based on said quantitative machine status and various event data in a daily report format of each of the large number of machinery.

19. A base station as set forth in claim 18, characterized in that said center server performs statistical processing on the cumulative data for each serial number of the machinery to find the average value and transmits replacement time information for each part to each of said large number of machinery.

20. A base station as set forth in claim 17, characterized in that said base station is provided with a web server and said web server is provided with a home page for transmitting said data in response to access from users using each of said large number of machinery or notifying the replacement time information of each part.

21. A base station as set forth in claim 17, characterized in that said data or replacement time information of each part is sent by e-mail to users using each of said large number of machinery.

22. A base station for managing individually or all together work capabilities of a large number of machinery deployed at construction sites, characterized by being provided with:

a communications device for communicating with a communications device provided at each of said large number of machinery;

a center server for identifying a serial number of each of said large number of machinery and transferring information with the control unit of said machinery through said communications devices; and a database managed by said center server and storing information for each model of said machinery and information relating to the operation of each machinery;

wherein said center server calculates a cumulative actual operating time for each serial number of said machinery, calculates a remaining time to maintenance based on said cumulative actual operating time for each serial number of said machinery, and transmits data relating to said remaining time to maintenance through said communications device to said machinery.

23. A base station for managing individually or all together work capabilities of a large number of machinery deployed at construction sites, characterized by being provided with:

a communications device for communicating with a communications device provided at each of said large number of machinery;

a center server for identifying a serial number of each of said large number of machinery and transferring information with the control unit of said machinery through said communications devices; and a database managed by said center server and storing information for each model of said machinery and information relating to the operation of each machinery;

wherein said center server calculates a cumulative actual operating time for each serial number of said machinery, calculates a cumulative actual operating time for each part for each serial number of said machinery, performs statistical processing on said cumulative actual operating time of said large number of machinery to find an average cumulative actual operating time, and transmits replacement time information of each part to users of each of said large number of machinery.

24. A base station for managing individually or all together work capabilities of a large number of machinery deployed at construction sites, characterized by being provided with:

a communications device for communicating with a communications device provided at each of the large number of machinery;

a center server for identifying a serial number of each of said large number of machinery and transferring information with the control unit of said machinery through said communications devices; and a database managed by said center server and storing information for each model of said machinery and information relating to the operation of each machinery;

wherein said center server calculates cumulative data of various times including actual operating time based on a quantitative machine status and various event data in a daily report format of said large number of machinery, performs statistical processing on said cumulative data of various times for each serial number of said machinery to find an average value, and transmits replacement time information of each part to users of each of said large number of machinery.

25. A base station as set forth in claim 22, characterized in that said base station is provided with a web server, and said web server has a home page for transmitting said data in response to access from users using each of said large number of machinery or notifying the replacement time information of each part.

26. A base station as set forth in claim 22, characterized in that said data or said replacement time information of each part is sent by e-mail.

* * * * *